E. A. BOSTROM.
LEVELING INSTRUMENT.
APPLICATION FILED AUG. 27, 1908.
912,065.
Patented Feb. 9, 1909.
2 SHEETS—SHEET 1.
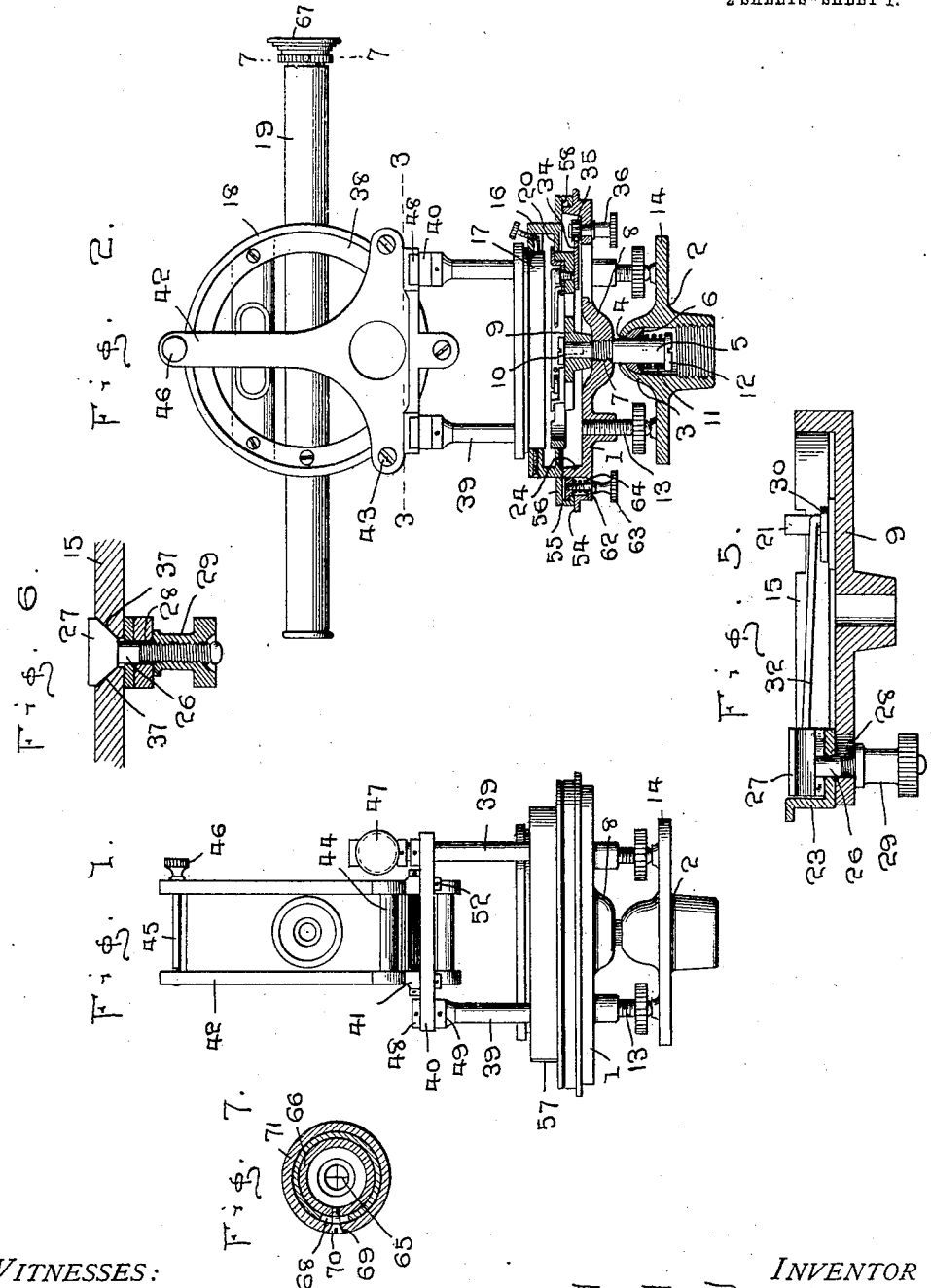
WITNESSES:
Thos. W. Riley
M. A. Newcomb
INVENTOR
E. A. Bostrom
BY
W. J. FitzGerald
Attorneys

E. A. BOSTROM.
LEVELING INSTRUMENT.
APPLICATION FILED AUG. 27, 1908.

912,065.

Patented Feb. 9, 1909.
2 SHEETS—SHEET 2.

WITNESSES:
Thos. W. Riley
M. A. Newcomb

INVENTOR
E. A. Bostrom
BY
W. T. FitzGerald
Attorneys

UNITED STATES PATENT OFFICE.

ERNST A. BOSTROM, OF ATLANTA, GEORGIA.

LEVELING INSTRUMENT.

No. 912,065.         Specification of Letters Patent.         Patented Feb. 9, 1909.

Application filed August 27, 1908. Serial No. 450,589.

*To all whom it may concern:*

Be it known that I, ERNST A. BOSTROM, a citizen of the United States, residing at Atlanta, in the county of Fulton and State of Georgia, have invented certain new and useful Improvements in Leveling Instruments; and I do hereby declare the following to be a full, clear, and exact description of the invention, such as will enable others skilled in the art to which it appertains to make and use the same.

My invention relates to new and useful improvements in leveling instruments, and is more particularly an improvement over that form of instrument disclosed in my prior patents No. 700717, No. 786093 and No. 814111, granted under dates of May 22, 1902, March 28, 1905, and March 6, 1906, respectively, and my object is to provide means whereby the level is convertible into a transit arrangement, for running lines or surveying, as the case may require.

A further object is to provide means for adjusting the telescope laterally and vertically when the telescope is being used for running lines, whereby the telescope may be brought into alinement with objects at opposite sides of the instrument.

A further object is to provide means for removably securing a compass to the instrument.

A still further object is to provide means for holding the compass against casual rotation.

A still further object is to provide mechanical means for adjusting the parts supporting the compass after the same has been locked against casual rotation.

A still further object is to provide means for removably securing a band to the instrument and providing locking mechanism therefor, whereby the band may be locked in its adjusted position and a still further object is to provide means for adjusting the crossed wires in the telescope to bring the same to a true vertical and horizontal position.

Other objects and advantages will be hereinafter referred to and more particularly pointed out in the claims.

Figure 3:
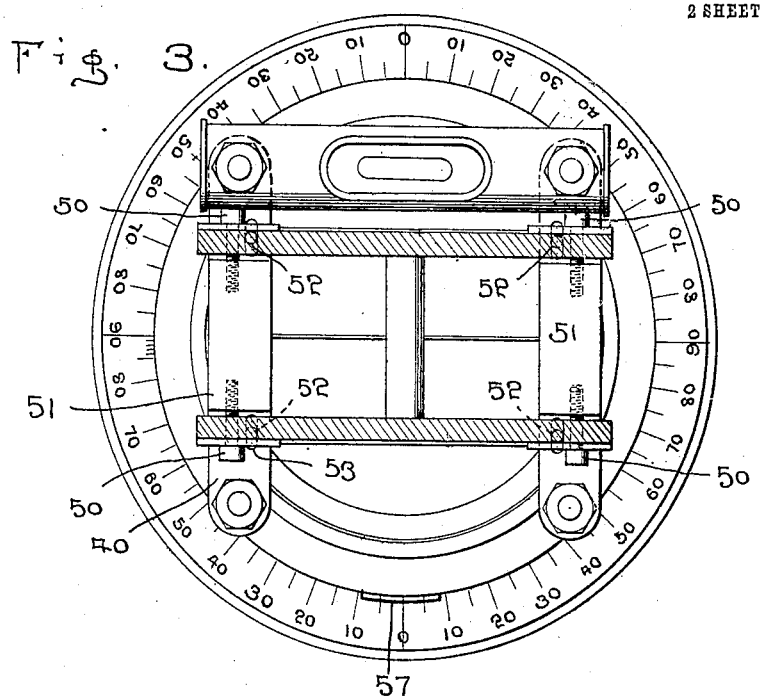
Figure 4:
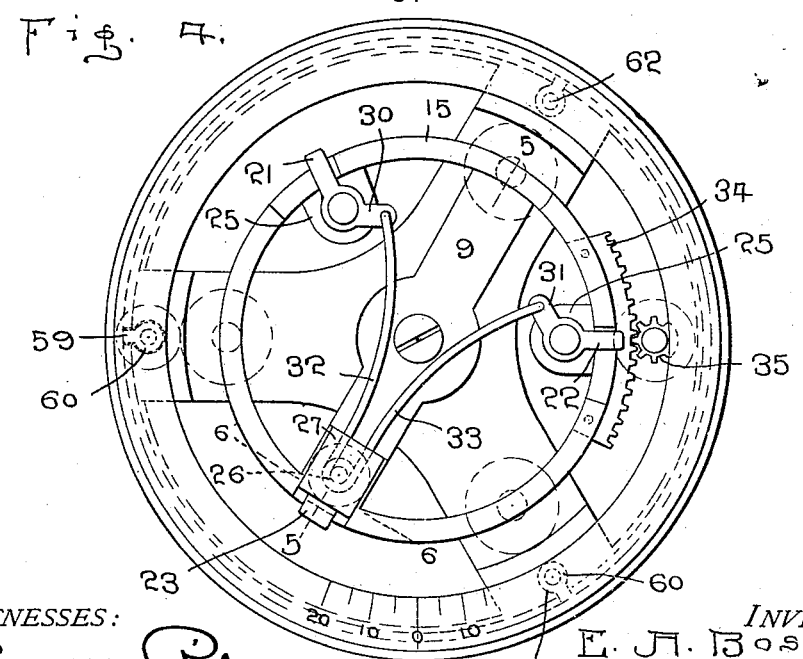

In the accompanying drawings which are made a part of this application, Figure 1 is an elevation of my improved instrument, showing the same provided with a compass and the telescope in position to be adjusted vertically. Fig. 2 is a central sectional view through the lower portion of the instrument showing the compass and telescope in side elevation. Fig. 3 is a sectional view on an enlarged scale as seen on line 3—3, Fig. 2. Fig. 4 is a top plan view of the base of the instrument, showing the compass and telescope removed. Fig. 5 is a sectional view as seen on line 5—5, Fig. 4. Fig. 6 is a detail sectional view as seen on line 6—6, Fig. 4, and Fig. 7 is a sectional view as seen on line 7—7, Fig. 2.

Referring to the drawings in which similar reference numerals designate corresponding parts throughout the several views, 1 indicates the base of my improved instrument, which is mounted upon the tripod head 2, said head having a socket 3 extending upwardly therefrom, the upper end of which is curved and provided with an opening 4, through which extends a bolt 5, the lower end of the bolt extending through a semi-globular keeper 6, the surface of which is curved to fit the contour of the curved portion of the socket 3 and as the opening 4 is greater in diameter than the diameter of the bolt 5, said bolt may be rocked to adjust the base 1.

The upper end of the bolt 5 is reduced in size and provided at a point below its upper end with threads 7, which threads extend through a threaded opening in the spider 8 of the base 1, the extreme upper end of the bolt being still further reduced in size and extended beyond the spider 8 to form a bearing for a frame 9, said frame being secured on the bolt by extending a screw 10 downwardly into a seat in the upper end of the bolt.

The base 1 and frame 9 are yieldingly held in juxtaposition to the socket 3 by introducing a spring 11 around the lower end of the bolt 5 and between the head 12 thereon and the keeper 6, the tension of said spring being sufficient to normally hold the base and frame against casual upward movement, although the spring will yield sufficiently to admit of the adjustment of the base 1 to level the instrument thereon, which adjustment is accomplished through the use of any preferred form of adjusting screws 13, the upper ends of which are threaded into seats in the base 1, while the lower ends thereof engage sockets on the flange 14 carried by the socket 3.

The frame 9 is preferably oblong and has secured to one of its ends a split ring 15, the split portion of the ring terminating over the opposite end of the frame from that to which the ring is secured, said ring being adapted to receive a collar 16 when a compass 17 is to be used in connection with the instrument and to receive a turret 18 supporting a telescope 19 when the instrument is to be used without the compass. When the compass is used in connection with the instrument, the collar 16 is provided with an inwardly extending bead 20, which bead is adapted to extend around the periphery of the split ring 15 and in position to be engaged by latches 21, 22 and 23 carried by the ring 15, which latches extend over and engage the upper face of the bead 20, thus limiting the upward movement of the collar and preventing casual removal thereof, the downward movement of the collar 16 being likewise limited by shoulders 24 extending upwardly from the base 1, the height of said shoulders being such as to maintain the collar 16 in such position as to cause the lower faces of the latches to rest on the upper face of the bead and thus hold the collar against vertical movement. The latches 21 and 22 are pivotally mounted on ears 25 carried by the ring 15, while the latch 23 is held in position on the frame 9 by means of a bolt 26, said bolt having a wedge-shape head 27 at its upper end, while the lower end thereof extends through a slot 28 in the frame 9 and is adapted to be engaged by a binding nut 29. The bolt 26 is adapted to be moved laterally through the slot 28 and carries the latch 23 therewith, so that when the bolt is moved inwardly to the inner end of the slot 28, said latch 23 will be out of engagement with the bead 20 and in order to simultaneously operate the latches 21 and 22 to swing the same out of engagement with the bead, whereby the collar and parts carried thereby may be removed from the base 1, the inner ends of said latches 21 and 22 are provided with arms 30 and 31, respectively, with which are adapted to engage pitmen 32 and 33, respectively, extending inwardly from the inner end of the wedge-shape head 27, the length of said pitmen being such that the latches 21 and 22 will be swung clear of the bead 20 when the latch 23 has been moved inwardly a sufficient distance to release the overhanging ends thereof from the bead 20.

The collar 16 normally revolves around the split ring 15, so that the telescope may be turned to any point of the compass and an observation made and when the collar is left free to revolve around the split ring, the telescope may be readily adjusted by hand. When however, it is desired to make a minute adjustment of the telescope, the loose ends of the split ring may be separated to expand the ring and engage the outer surface thereof with the inner edge of the bead 20, in which event the telescope is adjusted through the medium of a rack and pinion 34 and 35, respectively, the rack 34 being fixed to the frame 9 and the pinion 35 to a stem 36, the lower end of which extends through the base 1 and in position to be readily grasped and rotated manually so that by first moving the telescope to substantially the position required and then spreading the ring 15 to lock the collar thereto, the telescope may be further minutely adjusted by operating the stem 36 and rotating the frame 9 and parts secured thereto through the medium of the rack and pinion 34 and 35.

The ends of the split ring 15 are provided with tapered faces 37, which are adapted to engage with the tapered faces of the wedge shaped head 27, whereby when it is desired to expand the ring 15, the nut 29 is turned onto the bolt 26, which will result in lowering the bolt and head thereon in view of the fact that one end of the nut engages one face of the frame 29, such lowering of the head forcing the ends of the split ring outwardly and thereby expanding and moving the periphery of the ring into engagement with the inner face of the bead 20.

When observations are to be made through the telescope as a level only, the collar 16 and parts carried thereby are released from the split ring 15 by moving the bolt 26 inwardly to the inner end of the slot 28, this operation moving the latch 23 out of engagement with the bead 20, while the latches 21 and 22 are simultaneously moved out of engagement with the bead 20 through the medium of the pitmen 32 and 33, the turret 18 being then rested on the shoulders 24, and the flange or bead 38 within said turret engaged by the latches 21, 22 and 23, said turret operating with the split ring 15 in the same manner as the collar 16.

When the telescope is to be used for running lines as well as for observation purposes, and in conjunction with the compass 17, the collar 16 has secured thereto posts 39 to the upper ends of which are adjustably secured cross bars 40 and resting upon these bars are the base portions 41 of the standards 42, said standards being spaced apart a sufficient distance to snugly receive the turret 18 when said turret is entered edgewise between the standards, the lower ends or base portions of the standards being secured together by means of rods 43 and the standards are held separated a pre-determined distance by introducing thimbles 44 around the rods 43 between the standards and by placing the rods in such radius as to conform to the radius of the turret 18, said rods will form a support for the turret when introduced between the standards, but as one of the rods is located at the vertical center of the standards and the other rods at predetermined distances at each side of the vertical center of the standards, the turret may be readily rotated to raise and lower the object end of the telescope. The turret 18 is held against casual removal from between the standards 42 by introducing a rod 45 through the upper ends of the standards and immediately above the turret 18, one end of the rod 45 being threaded to enter a threaded opening in one of the standards, while the opposite end thereof is provided with a milled head 46, whereby said rod may be readily engaged or disengaged from the standards and after the telescope has been adjusted to the proper height, the rod 45 may be employed for locking the telescope in its adjusted position, the drawing in the upper ends of the standards clamping said standards firmly against the ends of the turret and holding the same against rotation between the standards. Two of the posts 39 are extended a distance above the cross bars 40 and have secured thereto the usual or any preferred form of spirit level 47, whereby the telescope may be readily leveled when desired and in order to minutely adjust the parts carrying the telescope, the standards 39 are provided with adjusting nuts 48 and 49 above and below the cross bars 40, respectively, and it will be readily apparent that by properly adjusting said nuts, the parts of the instrument carrying the telescope may be kept vertical at all times. By mounting the telescope in this manner, a line may be run from both sides of the instrument and at any degree of angle, which result is accomplished by first establishing the line at one side of the instrument and then removing the turret from between the standards and reversing the ends of the telescope and to minutely adjust the telescope laterally to bring the objects or lines at opposite ends of the telescope in alinement with each other, or the center of rotation of the instrument. The standards 42 are adjustably mounted on the cross bars 40 through the medium of screws 50, which screws extend through the base portions 41 and enter threaded seats in blocks 51 formed integral with the cross bars 41, said blocks extending upwardly between the base portions of the standards 42 and are of less length than the distance between said standards, whereby said standards and parts carried thereby may be moved laterally to adjust the telescope, or as commonly called, the line of collimation. After the standards have been properly adjusted through the medium of the screws 50, they are locked in their adjusted positions by introducing binding screws 52 through slots 53 in the cross bars 40, the upper ends of the binding screws being seated in threaded openings in the base portions 41, while the lower ends thereof are provided with heads which bind against the lower faces of the cross bars and serve to lock the standards in their adjusted positions.

The base 1 is provided with an annular shoulder 54, upon which is adapted to rest a band 55, extending inwardly from the upper edge of which is a plate 56, on which is delineated graduations, said graduations being divided into degrees and arranged to coöperate with an indicator 57 on the peripheral face of the collar 16 and in order to obtain a minute adjustment between the indicator and the degree graduations, said indicator may be divided into suitable divisions for reading minutes and seconds. The band 55 is rotatably mounted on the shoulder 54, so that when the telescope is to be swung a certain number of degrees to the right or left of its initial position, the band 55 is first rotated until the degree to which the telescope is to be swung, is in registration with the zero mark on the indicator, when the telescope is to be swung around until the zero mark on the indicator registers with the zero on the plate 56 and in order to hold the band against casually leaving the shoulder, the inner face of the band is provided with a circumferential channel 58, in which are adapted to take tongues 59 of retaining washers 60, said washers being preferably three in number and seated in recesses 61 in the shoulders 24 of the base 1, said washers being retained in position by threading the openings in the washers and introducing therein the threaded ends of bolts 62, said bolts being introduced upwardly through the base 1. The band 55 may be locked in its adjusted position by continuing the recess around one of the washers to a point adjacent the lower face of the base 1 so that said washer may be moved upwardly and downwardly, the bolt 62 in this instance being provided with a thumb piece 63 so that it may be readily turned to clamp the tongue 59 against the band 55 and thereby hold the band against rotation on the shoulder 54. The washer 60, employed for clamping the band in its adjusted position, is normally supported in an elevated position by means of a spring 64 which surrounds the bolt 63 and between the washer 60 and bottom of the recess 61, so that when the washer is not employed for holding the band, the tongue on said washer will be prevented from binding on the face of the channel 58.

In adjusting the telescope to level the same, it frequently happens that the wires 65 in the telescope are moved out of their vertical and horizontal positions, so that an accurate observation cannot be made and in order to rectify the wires 65 and to bring them to an exact vertical and horizontal position without moving the entire telescope, the wires 65 are secured to a frame 66, which snugly fits within the eye piece 67 of the telescope, the wall of the eye piece having a slot 68 therein, through which extends a screw 69, the inner end of the screw engaging the frame 66, while the outer end thereof is provided with the usual form of flared head 70, which head engages a similarly formed seat in an adjusting ring 71. In rectifying the positions of the crossed wires, the screw 63 is loosened sufficiently to permit the ring 71 to rotate around the wall of the eye piece and after the wires have been adjusted the clamping screw 69 is again tightened, which will bind the ring 71 and frame 66 on opposite sides of the wall of the eye piece and hold the wires 65 in their adjusted positions until such time as it is again desired to change the position of the wires.

In operation, should it be desired to make observations through the telescope, the turret is engaged with the split ring 15 by first moving the bolt 26 inwardly and thus disposing the ends of the latches out of the path of the flange 38 on the interior of the turret when the turret is lowered in position around the split ring 15 and the bolt 26 again moved outwardly, which will dispose the projecting portions of the latches over the flange 38 and secure the turret in position on the base. Should it be desired however, to run lines as well as make observations, the turret is released from the base and the collar 16 mounted in position thereon, when the turret is to be turned edgewise and introduced between the standards 42 and if desired, a compass 17 may be mounted in the collar 16 and used in connection with the telescope. After the telescope has been secured between the standards 42, the instrument is leveled by operating the nuts 48 and 49 on the post 39, after which the observations are made through the telescope and if the lines at opposite ends of the telescope do not exactly coincide with each other, the telescope may be shifted laterally in either direction through the medium of the screws 50, until the proper alinement has been reached when the parts may be secured in their adjusted positions by means of the screws 52. If, after the line is established at a particular point and it is desired to establish a line at a different angle, the collar 16 is locked in its adjusted position by expanding the ring 15 and the band 55, having the graduations thereon, rotated around the collar until the degree indicating the angle at which the new observation or line is to be run, is brought into registration with the indicator on the collar, when the band is locked in its adjusted position by operating the thumb nut 63 and clamping the washer at the upper end of the bolt to which the thumb nut is secured against the band 55, when the collar 16 is released from the split ring 15 and the collar and telescope carried thereby, rotated until the indicator is in registration with zero of the graduations on the band 55, when the observation may be made and should a minute adjustment of the telescope be required, the ring may be again expanded and the collar 16 locked thereon and the adjustment made through the medium of the rack and pinion 34 and 35.

It will thus be seen that I have provided a very cheap and economical form of surveying instrument and one that may be readily and quickly applied to use for making observations or running lines and it will likewise be seen that a line may be run from opposite sides of the instrument without changing the position of the supporting parts of the instrument. It will likewise be seen that the various movable parts of the device may be locked against casual movement, whereby the several parts may be held in their adjusted positions and likewise that by mounting the various parts as shown, minute adjustment of said parts may be readily accomplished.

What I claim is:

1. In a surveying instrument, the combination with a base having shoulders thereon; of a split ring means to expand said split ring, whereby an object surrounding the ring and resting on said shoulders will be gripped and additional means coöperating with the ring to hold the object in position on the shoulders.

2. In a surveying instrument, a base, means to adjustably support said base, a band carried by said base, means to lock the band in its adjusted position, a collar carried by the frame, means to hold the collar on the frame and additional means to lock the collar against casual rotation.

3. In a surveying instrument, the combination with a base having shoulders thereon; of a circular object supported by said shoulders and having an inwardly extended bead, a split ring carried above said frame, means carried by the ring adapted to engage the bead and hold the object on the base, means to expand the ring and lock the object thereon and additional means to manually adjust the ring and parts coöperating therewith.

4. In a surveying instrument, the combination with a base and means to adjustably support the same; of a collar rotatably mounted on said base, posts carried by the collar, standards extending upwardly from the posts, a telescope adapted to extend between the standards, means to adjustably support the telescope, additional means to lock the telescope in its adjusted position and means to move said standards and telescope laterally.

5. In a surveying instrument, the combination with a plurality of posts and cross bars adjustably secured to the upper ends of said posts; of a pair of alining standards, means to space said standards a pre-determined distance apart, a telescope extending between the standards, a turret carrying said telescope and adapted to rest on the spacing means and means to retain the telescope between the standards and lock the same against movement when desired.

6. In a surveying instrument, the combination with a base and a collar rotatably mounted thereon, said collar having an inwardly extending bead; of a frame mounted above the base, a split ring carried by said frame, the ends of the split portions having tapered faces, a bolt extending through the frame, a wedge-shaped head at the upper end of the bolt adapted to coöperate with the tapered faces of the ring and spread the ring whereby the bead will be engaged and the collar held against casual rotation.

7. In a surveying instrument, the combination with a base and a collar rotatably mounted thereon; of a frame, a split ring fixed to said frame, means carried by the ring to hold the collar in engagement with the base, means to expand the ring and secure the collar thereto, a rack secured to said frame and a pinion carried by the base adapted to coöperate with the rack and rotate the collar when the pinion is rotated.

8. In a surveying instrument the combination with a plurality of posts, cross bars carried by said posts and means to raise and lower said cross bars; of a pair of standards, the base portions whereof are adapted to rest on said cross bars, screws extending through the base portions and into parts of the cross bars, whereby the standards may be shifted laterally and means to lock the standards in their adjusted positions.

9. In a surveying instrument, the combination with a base and a circular body adapted to rest on said base, said circular body having an inwardly extending portion thereon; of a frame, one end of which is provided with a slot, a split ring fixed to the opposite end of the frame, latches carried by said ring adapted to engage the projection on the circular body and hold the same in position on the base, a movable bolt extending through the slot in the end of the frame and between the ends of the split ring, a head at the upper end of said bolt adapted to spread the ring and engage the same with the inwardly projecting portion of the member supported by the base and means coöperating with said latches and head to move the latches out of the path of the inwardly projecting portion when the bolt is moved to the inner end of the slot in the frame.

10. In a surveying instrument, the combination with a base, a telescope adapted to be mounted on the base and means to adjust the telescope to level the same; of crossed wires in the telescope, a frame supporting said wires and means to shift the wires and frame and hold the same in their adjusted positions, comprising an adjusting ring and a screw extending through said adjusting ring into the frame, the wall of the telescope having a slot therein to permit lateral movement of the screw.

In testimony whereof I have signed my name to this specification in the presence of two subscribing witnesses.

ERNST A. BOSTROM.

Witnesses:
  M. F. BARNES,
  H. J. SIMONTON.